Sept. 14, 1965   B. C. HOOKER ETAL   3,206,673
CONTROL SYSTEM TESTING APPARATUS HAVING A FUNCTION
GENERATOR SUPPLYING SQUARE, TRIANGULAR
AND SINE SIGNALS
Filed June 19, 1961
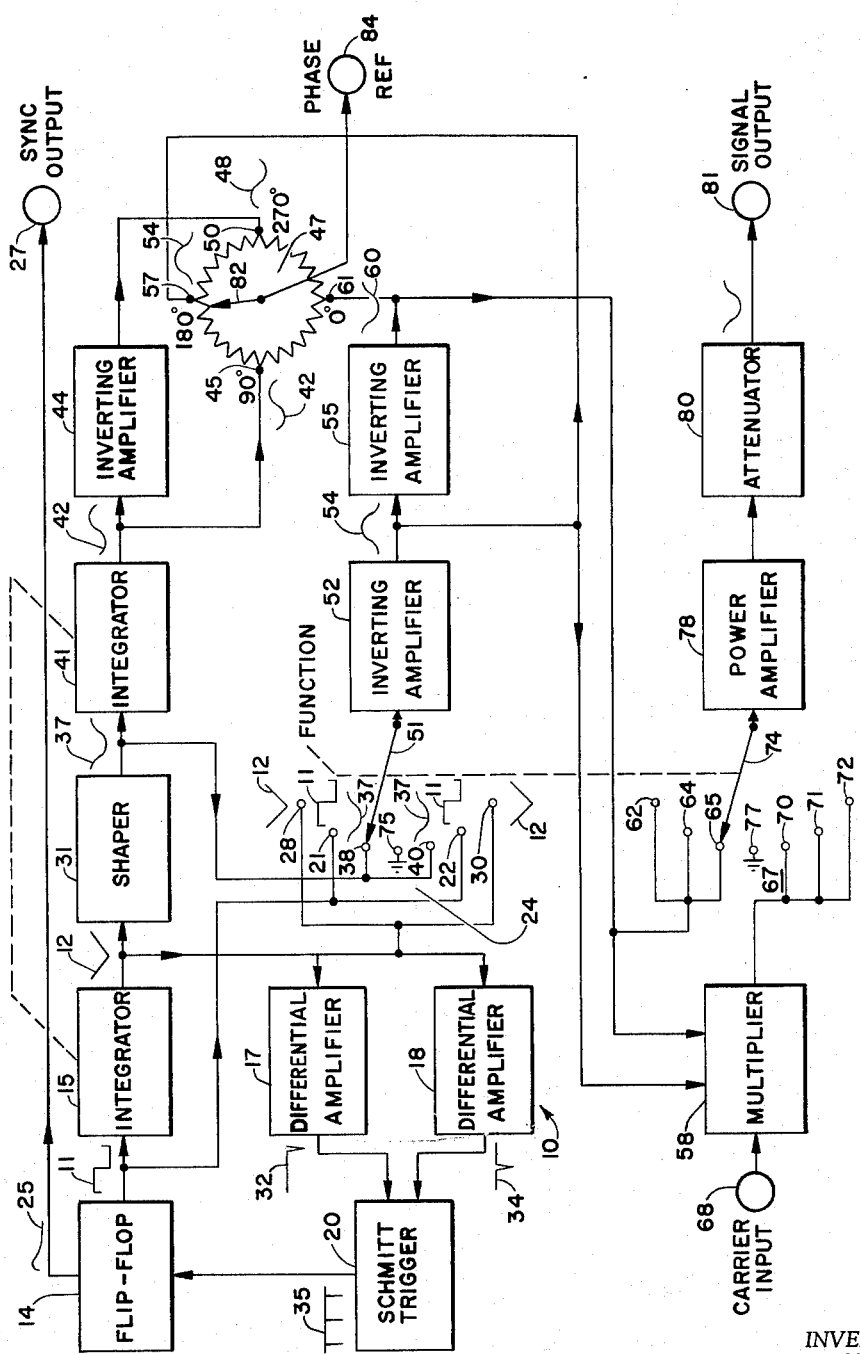
INVENTORS
RICHARD N. MERINGTON
BILLY C. HOOKER
BY
William L. Jones
ATTORNEY

United States Patent Office 3,206,673
Patented Sept. 14, 1965

3,206,673
CONTROL SYSTEM TESTING APPARATUS HAVING A FUNCTION GENERATOR SUPPLYING SQUARE, TRIANGULAR AND SINE SIGNALS
Billy C. Hooker, Dallas, and Richard N. Merington, Irving, Tex., assignors, by mesne assignments, to Ling-Temco-Vought, Inc., Dallas, Tex., a corporation of Delaware
Filed June 19, 1961, Ser. No. 118,037
3 Claims. (Cl. 324—57)

This invention relates to the testing of control systems, such as those employing servomechanism and the like.

More particularly, the invention relates to testing apparatus and methods useful in obtaining information relative to the performance or behavior of a control system or servomechanism under certain test conditions, such as where information is desired concerning the response of the servo to selected types and frequencies of input signals.

While the invention is of general application, it will perhaps be most widely applied in connection with the obtainment of information relative to certain phase, amplitude, frequency or transient response characteristics of a servo control system. This information may indicate or prove helpful in making an evaluation of the performance or behavior of the control system under actual operating conditions. For example, Bode or Nyquist plots or graphs may be made showing certain response patterns or characteristics indicated by the test data.

Prior hereto various proposals have been made for simplification and improvement of the measurement and related techniques involved in evaluating or analyzing servo control systems. While certain of these proposals of the prior art have met with considerable success and have proven generally satisfactory for many uses, it is recognized that there is need for further improvement, particularly in that it is desirable to further simplify the testing procedure and to provide more reliable and versatile testing equipment. Also, there is a recognized need for improved testing equipment which includes simple and reliable means for permitting relatively accurate indications or recordings to be made of the information and data obtained during the tests. Further, there is particular need for improved testing equipment which is adapted to supply to the servo system any of a variety of types of input signals at any of a variety of repetition rates or frequencies. It is especially recognized that there is need for equipment capable of supplying signals at any selected rate or frequency within a relatively wide range extending both below and above the natural or resonant frequency of the servo system being tested.

A general object of the present invention is to provide improved testing apparatus and methods of the type described.

Another object of the invention is to provide improved testing equipment and techniques for use in obtaining information relative to the performance or behavior of a servo control system in response to selected input signals.

Another object of the invention is to provide improved testing apparatus and methods for use in evaluating or analyzing any of a variety of servo control systems.

A more specific object of the invention is to provide improved testing apparatus and methods useful with both direct-coupled and carrier-coupled types of servo control systems.

Another specific object of the invention is to provide improved testing apparatus and methods wherein provision is included for supplying to the servo system any of a variety of input signals at any of a variety of repetition rates or frequencies.

Another specific object of the invention is to provide improved testing equipment which is reliable, relatively simple to operate and is particularly suited for use with electronic indicating or recording devices capable of handling information or data in the form of signals having relatively rapid repetition rates.

A further specific object of the invention is to provide improved testing apparatus and methods wherein provision is included for selectively obtaining information relative to one or more of the phase, amplitude, frequency and transient response characteristics of a servo control system, including certain response patterns obtained with input signals distributed over a relatively wide range of frequencies.

In accordance with one aspect of the invention, comparison is made of certain relationships between signals having known characteristics representative of the control system input signals and signals which are or represent the control system output signals resulting from the particular input signals involved. In accordance with another aspect of the invention, comparison is made of certain relationships between control system output signals resulting from different input signals. From these comparisons, information may be obtained relative to certain response characteristics which are helpful in evaluating or analyzing the performance or behavior of the control system under actual operating conditions.

In a preferred arrangement, the testing apparatus includes means for selectively supplying to the control system any of a variety of types of input signals (such as a step or square wave, an alternating ramp or triangular wave, and an approximate sine wave) at any of a relatively large variety of repetition rates or frequencies. For example, relatively low frequency signals are available to permit obtainment of information concerning operation of the control system under conditions where its input signals are considerably below its natural or resonant frequency. Also, signals are available at any selected rate or frequency within a relatively wide range, such as within a range extending from considerably below to considerably above the natural or resonant frequency of the control system being tested. Thus comparison may be made between the information obtained with each of a relative large number of input signals to permit various response characteristics to be recorded, such as for use in making a plot or graph showing response patterns.

Where comparison is made of the phase relationship between control system output signals and signals representative of their corresponding input signals, information is obtained concerning phase changes, such as a phase lag, occurring in the servomechanism or elsewhere in the portion of the control system being tested.

Where the input signals are abruptly changing signals, such as triangular or square wave signals, the information obtained by comparing the resulting output signals with their known characteristic waveforms may prove very helpful in determining or obtaining an indication of the transient response characteristics of the control system.

For use in testing carrier-coupled types of servo control systems, provision is preferably included for supplying modulated carrier-wave input signals to the control system. The unmodulated carrier-wave may be obtained, for example, from a source within the control system being tested. The modulating signals are obtained from within the testing apparatus itself and, as aforesaid, may be any of a variety of types at any of a relatively large variety of repetition rates or frequencies.

The foregoing and additional objects, advantages and novel features of the invention will be more apparent from the following description when read in conjunction with the accompanying drawing in which the single figure is a diagrammatic representation, mainly in block diagram form, showing one arrangement of testing apparatus in accordance with the invention.

Referring to the drawing in detail, there is shown testing apparatus 10 which, as will appear more fully hereinafter, is suited for use in obtaining information relative to a variety of response characteristics and may be employed, for example, in connertion with the evaluation or analysis of any of a variety of servo control systems.

It is understood that the testing apparatus 10 includes circuit components and parts which are arranged or combined as an example of the invention but which may individually be of conventional or standard design. Accordingly, it is believed unnecessary to give herein a full and detailed description of the construction and operation of each component or part shown in the drawing.

As illustrated, the testing apparatus 10 includes a signal generating section which is adapted to make available, at substantially the same time, a variety of types of signals, including step or square wave signals 11 and alternating ramp or triangular wave signals 12.

The signal generating section includes a bistable multivibrator or flip-flop 14 which is part of an oscillator loop. The loop also includes a first integrator 15, differential amplifiers 17 and 18, and a Schmitt trigger 20.

The flip-flop 14 is adapted to produce the square wave signals 11, which signals 11 are supplied to terminals 21 and 22 of a function switch 24 and are also supplied to the input circuit of the integrator 15. Additionally, the flip-flop 14 supplies sync signals 25 to a sync output terminal or jack 27, which signals 25 are thus made available to be at times supplied to other equipment, as will appear more fully hereinafter.

The first integrator 15 is adapted to change the square wave signals 11 it receives from the flip-flop 14, as aforesaid, into the triangular wave signals 12. These signals 12 are supplied to terminals 28 and 30 of the function switch 24 and are also supplied to the input circuit of each of the differential amplifiers 17 and 18. In addition, the triangular wave signals 12 are supplied to the circuit of a shaper 31, the purpose of which will be described presently.

The differential amplifiers 17 and 18 are controlled by the triangular wave signals 12 supplied thereto by the integrator 15. It will be noted that the signals 12 alternately decrease and increase at approximately linear rates. While shown supplied to both amplifiers 17 and 18 simultaneously, the increasing portions of the signals 12 control only the one of these (for example, the amplifier 17) which is sensitive to positive-going signals, while the decreasing portions of the signals 12 control only the one (for example, the amplifier 18) which is sensitive to negative-going signals.

If desired, each of the differential amplifiers 17 and 18 may include two tubes, one of which is normally bised to cut-off, such as by a negative voltage developed due to current flow in the other tube. In the amplifier 17, which for example is sensitive to the increasing or positive-going portions of the signals 12, the negative bias voltage is sufficiently overcome to permit the flow of current to develop an output signal 32 when the increasing portion of each of the signals 12 reaches a sufficiently high positive value. On the other hand, in the amplifier 18, which for example is sensitive to the decreasing or negative-going portions of the signals 12, such signals 12 are applied to reduce the current flow in that tube which is normally developing the negative bias or cut-off voltage for the other tube. Thus, the negative bias voltage in amplifier 18 is sufficiently overcome to permit the flow of current to develop an output signal 34 when the decreasing portion of each of the signals 12 reaches a sufficiently high negative value.

With this arrangement, it will be noted that each of the output signals 34 of the differential amplifier 18 occurs when one of the triangular wave signals 12 is approaching its maximum negative value, while each of the output signals 32 of the differential amplifier 17 occurs when one of the triangular wave signals 12 is approaching its maximum positive value. These signals 32 and 34 are supplied to control the Schmitt trigger 20 which in turn produces triggering pulses 35 supplied to control the flip-flop 14.

The operation of the Schmitt trigger 20 is such that a triggering pulse 35 is produced for each control signal 32 and 34 supplied thereto. Each of the pulses 35 may be considerably sharper, as shown, than its corresponding control signal 32 or 34. It will be noted that a triggering pulse 35 is developed and supplied to the flip-flop 14 when each of the positive-going and negative-going portions of the triangular wave signals 12 reaches a sufficiently high positive or negative value, as the case may be.

With this arrangement, the flip-flop 14 is triggered by the pulses 35 at a repetition rate or frequency which is determined in part by the slope or ramp function of the triangular wave signals 12 produced by the integrator 15.

Thus, as will appear more fully hereinafter, the repetition rate or frequency of the flip-flop 14 may be controlled by controlling the slope or ramp function of the triangular wave signals 12.

As previously indicated, the triangular wave signals 12 are supplied also to the circuit of the shaper 31. The purpose of the shaper 31 is to change the shape of the triangular wave to an approximate sine wave, thus producing sine wave signals 37 the frequency of which is the same as the repetition rate of the triangular wave signals 12. These sine wave signals 37 are supplied to terminals 38 and 40 of the function switch 24 and are also supplied to the input circuit of a second integrator 41.

The main purpose of the second integrator 41 is to shift the phase of its sine wave input by 90 degrees, thus producing sine wave signals 42 which are 90 degrees out-of-phase, as compared with the sine wave signals 37 supplied to the terminals 38 and 40 of the function switch 24. Also, it will be noted that the sine wave signals 42 are in effect 90 degrees out-of-phase, in comparison with the triangular wave signals 12 appearing at terminals 28 and 30 of the switch 24.

As previously indicated, it is preferred that the various output signals of the testing apparatus 10 be available at any selected rate in a relatively wide range, including signals both considerably below and considerably above the natural or resonant frequency of the control system being tested. As one example, the signal generating section of the apparatus 10 may produce or supply square, triangular and sine wave signals at any selected repetition rate or frequency within a range extending from about 0.005 to about 1,000 cycles per second.

To this end, it is preferred that the slope or ramp function of the first integrator 15 be adjustable or variable over a sufficiently wide range to permit a relatively wide variation in the repetition rate or frequency of the triggering pulses 35 supplied to control the flip-flop 14. This may be accomplished by adjusting or varying certain of the circuit values in the integrator 15.

For example, the first integrator 15 may include a high-gain, direct-coupled amplifier with an adjustable series summing resistance and with an adjustable feedback capacitance. The input circuit may advantageously include a frequency vernier potentiometer which is adjustable to control the input voltage. The feedback circuit may include a number of capacitors and a suitable switching means for selecting which of the capacitors are used on each frequency range or band. Thus, the potentiometer and switching means permit adjustments or variations to be made in the time constants affecting the circuit values in the integrator 15.

It will be understood that an adjustment or variation affecting the circuit values in the integrator 15, which results in changing the repetition rate or frequency of the flip-flop 14, as aforesaid, also results in changing the repetition rate or frequency of the subsequent triangular wave signals 12 and, thus, of the sine wave signals 37 which are developed in the shaper 31.

Since it is preferred that the sine wave signals 37 which are supplied to the input circuit of the second integrator 41 always be shifted in phase by 90 degrees, regardless of the particular frequency at which the signal generating section is then operating, it is preferred that the time constants affecting the circuit values of such integrator 41 also be adjustable or variable, such as by switching and adjustment means ganged or otherwise connected so as to be movable with the switching and adjustment means used to change the time constants of the first integrator 15. Such an arrangement is indicated in the drawing by the dashed lines interconnecting the integrators 15 and 41.

The sine wave output signals 42 of the second integrator 41 are supplied to the input circuit of an inverting amplifier 44 and also are supplied to a 90-degree terminal 45 of a rotary potentiometer 47. The inverting amplifier 44 is adapted to shift the phase of the signals 42 by 180 degrees, thus producing sine wave signals 48 which are 270 degrees out-of-phase, as compared with the signals 11, 12 and 37 appearing at the function switch 24. These sine wave signals 48 are supplied to a 270-degree terminal 50 of the rotary potentiometer 47.

The function switch 24 has a movable arm 51 which permits an operator to select the square wave signals 11 from terminals 21 or 22, the triangular wave signals 12 from terminals 28 or 30, or the sine wave signals 37 from the terminals 38 or 40.

The switch arm 51 supplies the selected signals to the input circuit of an inverting amplifier 52 which is adapted to shift the phase of the signals by 180 degrees. For example, assuming the switch arm 51 is positioned in contact with terminal 38, as shown in the drawing, the sine wave signals 37 thus supplied to the input of the amplifier 52 are shifted in phase by 180 degrees to produce sine wave output signals 54. These signals 54 are supplied to the input circuit of another inverting amplifier 55 and also are supplied to a 180-degree terminal 57 of the rotary potentiometer 47. Additionally, the signals 54 are supplied to a multiplier 58, the purpose of which will be described presently.

The inverting amplifier 55 is adapted to shift the phase of the signals 54 by another 180 degrees to produce sine wave output signals 60 which are 360 degrees out-of-phase, as compared with the signals 12 and 37 appearing at the function switch 24. However, due to the very rapid transit time of the electrical energy, as compared with the duration of a cycle of one of the signals, the signals 60 are for all practical purposes in-phase with the signals 12 and 37. Thus, the signals 60 may be supplied, as shown, to a 0-degree terminal 61 of the rotary potentiometer 47.

The output signals 60 of the amplifier 55 are also supplied to the multiplier 58 and to terminals 62, 64 and 65 of a function switch 67.

When the control system being tested is of the carrier-wave type, a carrier-wave input signal (not shown) is supplied to input terminal or jack 68 which is electrically connected to the multiplier 58. The carrier-wave input may be obtained from the control system being tested and may be a continuous wave within the frequency range extending, for example, from about 50 to about 10,000 cycles per second. The main purpose of the multiplier 58 is to generate or supply a modulated carrier-wave output signal (not shown) to terminals 70, 71 and 72 of the function switch 67. This signal is the product obtained by multiplication of the carrier-wave input signal by a selected modulation signal. This multiplication may be accomplished by mechanization of the expression:

$$f(xy) = (x+y)^2 - (x-y)^2 = 4xy$$

For example, the multiplier 58 may include an input transformer having a primary winding across which the carrier input signal is applied and having two center-tapped secondary windings, with the center-tap of one winding being driven by the 180-degree output signals 54 and with the center tap of the other winding being driven by the 0-degree output signals 60, so that summation of $(x+y)$ and $(x-y)$ occurs at the transformer. The signals appearing across each of the secondary windings may be applied to separate square law shaping networks, such as to biased diode squaring circuits, and then the outputs of the two shaping networks may be summed to complete the mechanization of the above mathematical expression. With this type of an arrangement, the multiplier 58 has a relatively broad band width. For example, in the multiplier 58 there may be less than 2 degrees of carrier phase shift over a range of frequencies extending from about 50 to about 5,000 cycles per second.

The function switch 67 has a movable arm 74 which permits an operator either to select the sine wave output signals 60 (for example) or one of the other output signals of the amplifier 55 appearing on terminals 62, 64 or 65 or to select one of the modulated carrier-wave output signals of the multiplier 58 appearing on terminals 70, 71 or 72. It is preferred that the movable arm 74 of the function switch 67 be ganged or otherwise connected so as to be movable with the movable arm 51 of the function switch 24, as indicated by the dashed lines in the drawing interconnecting the arms 51 and 74. It will be noted that the arm 74 selects the output signals from the multiplier 58 only when the arm 51 is selecting one of the signals appearing on terminals 22, 30 or 40 of the function switch 24. Likewise, the movable arm 74 of the switch 67 selects the direct output signal from the inverting amplifier 55, rather than the modulated carrier-wave output signal from the multiplier 58, whenever the movable arm 51 of the switch 24 is selecting one of the signals appearing at terminals 21, 28 or 38 thereof.

It will be noted that the function switches 24 and 67 are shown provided with terminals 75 and 77, respectively, which are connected to ground and thus do not have signals appearing thereat. These terminals 75 and 77 are mainly for the purpose of permitting an operator to avoid selecting any of the aforesaid signals, such as might be desired during the course of calibrating or repairing the equipment.

The arm 74 of the function switch 67 supplies the signals, selected as aforesaid, to the input of a power amplifier 78 which in turn supplies the signals (without overall phase change) through an attenuator 80 to a signal output terminal or jack 81. The attenuator 80 is adjustable and is preferably provided with calibrated control knobs or other suitable means for indicating the amount by which the output signals are attenuated. For example, the attenuator 80 may include several T pad variable resistances with knobs calibrated in small increments, such as in 0.1 decibel units, to permit relatively accurate information to be obtained by direct readings concerning the relative attenuation occurring at each setting of the control knobs.

While the output signals 54 and 60 appearing, respectively, at the 180-degree terminal 57 and at the 0-degree terminal 61 of the potentiometer 47 are shown as sine waves, it is understood that whether these signals 54 and 60 are square, triangular or sine waves depends upon the position of the switch arm 51. Likewise, the type of signals appearing at the signal output jack 81 depends upon the positioning of the ganged switch arms 51 and 74. On the other hand, the sine wave output signals 42 and 48 appearing, respectively, at the 90-degree terminal 45 and at the 270-degree terminal 50 of the potentiometer 47 do not change to square or triangular wave signals when the ganged switch arms 51 and 74 are moved.

The potentiometer 47 has a wiper arm 82 which is movable along the circular resistance element to which the terminals 45, 50, 57 and 61 are connected. The arm 82 is adapted to supply signals to a phase reference output terminal or jack 84 to which other equipment is at times connected, as will appear more fully hereinafter.

It is preferred that the potentiometer 47 be of the linear type and be relatively highly accurate, so that a relatively linear and uniform amount of both mechanical and electrical variation occurs for each angular movement or displacement of the wiper arm 82. Also, it is preferred that angularly adjacent ones of the terminals 45, 50, 57 and 61 be relatively accurately spaced apart by 90 degrees.

With suitable calibration of the control knob or dial of the potentiometer 47, it thus is possible to read directly and relatively accurately the phase variations which correspond to the various positions of the wiper arm 82 as it is rotated or moved from 0 to 360 degrees.

In order to analyze or evaluate the performance of a servo control system, it is ordinarily desirable to obtain information concerning objectionable and other phase changes which occur. Also, information is desired concerning changes in gain or amplification characteristics of the servo control system which occur with different input signals and signal frequencies. Additionally, information is desired concerning the response characteristics of the servo control system where more or less abruptly changing input signals are employed, thereby indicating its performance or behavior under transient conditions.

In accordance with the present invention, the desired information is obtained, using the apparatus 10 and related equipment, by making certain measurements and comparisons indicative of the objectionable and other changes which occur in the servo control system.

The operation of the testing apparatus 10 will be described with particular reference to its application in testing operations wherein an oscilloscope is employed in making measurements of or comparisons between certain signals, such as in comparing signals with their known characteristics or in making comparisons between signals representative of the input signals supplied by the apparatus 10 to the servo system being tested and signals which are or represent the servo system output signals obtained using the particular input signals involved. While other types of measuring or indicating equipment may be employed, if desired, the oscilloscope offers certain operational and convenience advantages, particularly in connection with making comparisons involving certain phase, frequency and shape characteristics of the signals.

In testing or measuring the phase and gain changes occuring in a servo system, the signals obtained from the signal output jack 81 of the apparatus 10 are supplied to the input of the servo system to be tested, whereupon the resulting servo system output signals are supplied to the one set of the deflection plates (for example, to the vertical or Y-axis plates) of the oscilloscope. The signals appearing at the phase reference output jack 84 are supplied to, for example, the horizontal deflection plates of the oscilloscope. If the servo system is of the direct-coupled type, the function switches 24 and 67 are in the positions shown in the drawing. That is, the switch 24 has its arm 51 positioned so as to select the sine wave signals 37 appearing at terminal 38, while the switch 67 has its arm 74 positioned so as to select the sine wave signals 60 appearing at terminal 65.

With this arrangement, the signals appearing at the phase reference output jack 84 are sine wave signals the phase of which is adjustable by moving the wiper arm 82 of the potentiometer 47. On the other hand, the signals appearing at the signal output jack 81 are sine wave signals the phase of which is independent of the position of the wiper arm 82 of the potentiometer 47. Assuming that the wiper arm 82 is opposite the 0-degree terminal 61, the signals appearing at the output jacks 81 and 84 should be in-phase, for all practical purposes.

Accordingly, if there is no phase change occurring in the servo system being tested, the signals appearing at the deflection plates of the oscilloscope should be in-phase. If this situation exists, the Lissajous pattern appearing on the face or screen of the oscilloscope will be a straight diagonal line extending in a direction from the lower left portion toward the upper right portion of the oscilloscope face or screen. If the signals are 180 degrees out-of-phase, such as due to reversed connections, the diagonal line will extend in a direction from the upper left portion toward the lower right portion of the oscilloscope face or screen.

The actual measurement of the phase relationship between these two signals, and thus of the amount of any phase change occurring in the servo system involves adjusting the wiper arm 82 of the potentiometer 47 the amount necessary to obtain the desired Lissajous pattern on the oscilloscope screen. The phase change may then be read directly on the calibrated control knob of the potentiometer 47. For example, this reading will indicate the amount of phase lag which is occurring due to passage of one of the signals through the servo control system being tested.

In making the test for phase lag, as aforesaid, it will ordinarily be desirable for the frequency of the sine wave signals to be relatively low so that any response characteristics of the servo system occurring only at higher frequencies will not materially affect the results. To this end, the driving frequency of the apparatus 10 may be selected to be lower than the servo system frequency at which rate gain becomes important, thereby simulating the conditions which exist where there is static gain.

In testing the frequency response of the servo control system, it is desirable to make tests using signals extending over a relatively wide range of frequencies, such as from considerably below to considerably above the natural or resonant frequency of the system being tested. The present invention permits these tests to be made readily, since the frequency of the signal generating section of the apparatus 10 is variable over a relatively wide range, particularly as compared with arrangements wherein the signal is supplied through synchros or other devices which pass a relatively narrow band of frequencies.

Thus, using the connection or hook-up arrangement described already in connection with the phase lag measurements, the frequency of the signals appearing at terminals 81 and 84 of the apparatus 10 may be varied and information may be obtained from the oscilloscope concerning the response of the servo control system with differing input signal frequencies. For example, the gain or amplitude response at different frequencies may be determined.

In making these frequency response tests, it will ordinarily be desirable to compare the gain of the servo system at the different test frequencies with the gain under conditions where the input signal is a relatively low frequency, such as was used in making the foregoing phase response tests. The making of these comparisons may be facilitated by initially, or while using a relatively low frequency test signal, adjusting the amplitude of the signal appearing on the oscilloscope face or screen or other indicating device so that it has a given height or coincides with a reference mark or other indicator. Then, as signals of differing and higher frequency are used in repeating the test, the attenuator 80 of the apparatus 10 may be adjusted and readjusted, as necessary, to maintain the same amplitude of signal at the indicating device. Readings may be made directly from the calibrated control knobs of the attenuator 80. These readings will indicate the variations occurring in the gain of the servo control system at the various input signal frequencies employed in making the tests.

If desired, such as where there is an impedance mismatch between the output circuit of the apparatus 10 and the input circuit of the servo system being tested, a suitable resistance or other impedance matching device may advantageously be employed. For example, if the impedance of the input circuit of the servo system is appreciably higher than that of the attenuator 80, a resistor of suitable value may be connected in parallel with the servo system. On the other hand, a suitable resistor may be connected in series with the servo system where its input circuit impedance is lower than the impedance of the attenuator 80. With proper impedance matching, the readings appearing on the calibrated control knobs of the attenuator 80 will relatively accurately indicate the differences in gain or amplitude response occurring for different input signal frequencies.

The reading obtained at each frequency may be compared with the initial reading obtained for a reference or standard input signal frequency. For example, comparison may be made with the reading obtained at the low frequency used during the initial phase response test. This will indicate the rate gain of the servo system at each test frequency.

If desired, the various readings obtained may be recorded or otherwise displayed. For example, the readings may be employed in making a graph, such as a Bode or Nyquist plot, indicating the servo system response under different test conditions.

Where the transient response of the servo system is to be tested, the signals appearing at the sync output jack 27 of the apparatus 10 may be supplied to the oscilloscope and it will not be necessary to supply any signals then appearing at the phase reference output jack 84. The function switches 24 and 67 are ordinarily moved to positions selecting either the triangular or square wave signals, it being understood that the tests may be repeated as desired to compare the results obtained for any different types of available signals and for any available frequencies or repetition rates.

For example, assuming that the transient response of a direct-coupled type of servo system is to be tested, using a step or square wave input signal, the function switches 24 and 67 are moved to positions wherein their respective arms 51 and 74 are selecting the square wave signals appearing at terminals 21 and 64, respectively.

With this arrangement, the signals appearing at the signal output jack 81 are step or square wave signals which are supplied as the input signals to the servo system to be tested. The resulting servo system output signals may be compared with the known shape of step or square wave signals, such as by means of the oscilloscope. That is, the servo system output signals are supplied to one set of the deflection plates of the oscilloscope and caused to appear as a signal on the oscilloscope face or screen. As previously indicated, the signals appearing at the phase reference output jack 84 are not needed for these transient response tests. However, the sync output signals 25 appearing at the sync output jack 27 are supplied as external sync to the oscilloscope. By viewing the shape and other characteristics of the resulting pattern on the oscilloscope face or screen, information is obtained which may be compared with information already known concerning the usual shape of step or square wave signals (for example). It is believed by many that the test for distortions in the shape of the abruptly changing square wave signals are among the best tests available for indicating transient response characteristics of a servo control system.

If desired, the servo system output signals may be compared with signals obtained directly from the apparatus 10, such as by means of additional connections made to another oscilloscope and to the same circuits as are connected to the sync output jack 27 and the signal output signal jack 81 of the apparatus 10. Such an arrangement would permit simultaneous viewing of the exact signals to be compared.

Where the servo control system to be tested is of the carrier-coupled type, the present invention permits the foregoing and other phase, frequency and transient response tests to be conducted using the same test equipment as is used where the servo control system is of the direct-coupled type.

In testing a carrier-coupled system, the carrier wave input jack 68 is connected with a source of carrier waves of the desired frequency, such as with the carrier wave source used in the servo system to be tested. The function switches 24 and 67 are adjusted so that their respective arms 51 and 74 are selecting the desired signals. That is, the arm 51 of the switch 24 is selecting signals from one of the terminals 22, 30 or 40, while the arm 74 of the switch 67 is selecting signals from the corresponding one of the terminals 70, 71 or 72. For example, in making phase and frequency response tests, where sine wave signals are ordinarily desired, the arm 51 of the switch 24 is moved to terminal 40 and the arm 74 of the switch 67 is moved to terminal 70.

With this arrangement, the signals appearing at terminal 70 of switch 67 are sine wave modulated carrier signals, as also are the signals which appear at the signal output jack 81 and are supplied as the input signals to the servo system being tested. Using the same general connections or hook-up to the oscilloscope previously described with reference to the direct-coupled systems, the various phase and frequency response tests may be made, the data may be recorded, and a plot or graph may be prepared, as desired.

Likewise, in making transient response tests, the same general connections or hook-up may be employed as has been described with reference to the direct-coupled systems. Where the function switch 24 is adjusted so that its arm 51 is selecting the step or square wave signals 11 appearing at terminal 22, the signals appearing at terminal 71 and selected by the arm 74 of the switch 67 are square wave modulated carrier signals. Where the function switch 24 is adjusted so that its arm 51 is selecting the triangular wave signals 12 appearing at terminal 30, the signals appearing at terminal 72 and selected by the arm 74 of the switch 67 are triangular wave modulated carrier signals.

As also previously indicated with reference to the direct-coupled systems, the servo system output signals may be viewed on the oscilloscope face or screen and the information thus made available may be compared with information already known concerning the usual shape of the types of signals involved. As one alternative, two oscilloscopes may be employed and suitable circuit connections may be made to permit simultaneous viewing of the servo system output signals and the signals supplied thereto as input signals by the testing apparatus 10.

From the above and foregoing description, it is believed clear that the present invention permits improved control system testing to be readily and relatively accurately accomplished, with a reliable and relatively simple arrangement resulting in a highly versatile testing apparatus and with facilities being included which permit testing methods involving use of a relatively wide variety of input signals and signal frequencies.

While the invention has been thus described herein with particular reference to certain arrangements which may be involved, it is understood that these are by way of example and not by way of limitation, the scope of the invention being best defined in the appended claims.

We claim:
1. Control system testing apparatus comprising
   a bistable multivibrator establishing a square wave output signal;
   a first integrator conncted to receive said square wave signal and to integrate said square wave signal to produce a triangular output signal;
   a first differential amplifier connected to receive said triangular signal and responsive to the increasing portion of said triangular signal to emit a first pulse type signal;

a second differential amplifier connected to receive said triangular signal and responsive to the decreasing portion of said triangular signal to emit a second pulse type signal;

means connected to receive said first and second pulse type signals and responsive thereto supply triggering pulses to said multivibrator;

shaper means connected to receive said triangular signal and responsive thereto to establish a sine wave output signal;

switch means connected to said multivibrator, said first integrator, and said shaper to selectably pass said square wave signal, said triangular signal, and said sine wave signal;

a rotary potentiometer having taps at positions thereon corresponding to 0, 90, 180, and 270 degrees of phase rotation and having a wiper arm;

a second integrator connected to receive said sine signal from said shaper and to supply a signal 90 degrees out of phase with said sine wave signal to the 90 degree tap of said potentiometer;

a first inverting amplifier connected to receive a signal from said second integrator and to supply a signal 270 degrees out of phase with said sine wave signal to the 270 degree tap of said potentiometer;

a second inverting amplifier connected to receive signals from said switch means and to supply signals 180 degrees out of phase with the signals from said switch means to the 180 degree tap of said potentiometer;

a third inverting amplifier connected to receive signals from said second inverting amplifier and to supply signals in phase with the signals from said switch means to the 0 degree tap of said potentiometer; and output means connected to said wiper of said potentiometer.

2. A function generator comprising a bistable multivibrator establishing a square wave output signal;

an integrator connected to receive said square wave signal and to integrate said square wave signal to produce a triangular output signal;

a first differential amplifier connected to receive said triangular signal and responsive to the increasing portion of said triangular signal to emit a first pulse type signal;

a second differential amplifier connected to receive said triangular signal and responsive to the decreasing portion of said triangular signal to emit a second pulse type signal;

means connected to receive said first and second pulse type signals and responsive thereto to supply triggering pulses to said multivibrator;

shaper means connected to receive said triangular signal and responsive thereto to establish a sine wave output signal; and output means connected to said multivibrator; said integrator and said shaper to selectably supply said square wave signal, said triangular signal and said sine wave signal to apparatus connected to said output means.

3. The function generator of claim 2 further comprising means included in said integrator for varying the slope of said triangular output signal.

References Cited by the Examiner

UNITED STATES PATENTS

| 2,733,433 | 1/56 | Morrison. | |
| 2,816,266 | 12/56 | Nadolski | 324—88 |
| 2,881,388 | 4/59 | Behrend | 324—57 |
| 2,980,866 | 4/61 | Naines | 331—135 |
| 2,988,693 | 6/61 | Billig et al. | 324—57 |
| 3,039,054 | 6/62 | Hadley | 324—82 |
| 3,056,921 | 10/62 | Flarity | 324—57 |

OTHER REFERENCES

"Transient Video Analyzer"; article in Electronics, June, 1946, pages 130–135.

"Scope Calibrator and Pulse Generator"; article in Radio and TV news, November, 1958, pages 70–72.

WALTER L. CARLSON, *Primary Examiner.*

FREDERICK M. STRADER, *Examiner.*